United States Patent [19]

Weiland et al.

[11] 3,997,438
[45] Dec. 14, 1976

[54] PROCESS OF TREATING GELATINOUS SLUDGE AGGLOMERATIONS

[75] Inventors: Henry J. Weiland, Birmingham; Dewey W. Black, Tarrant City, both of Ala.

[73] Assignee: Environment Improvement Systems, Inc., Birmingham, Ala.

[22] Filed: Nov. 17, 1975

[21] Appl. No.: 632,291

[52] U.S. Cl. .............................................. 210/42 R
[51] Int. Cl.$^2$ ........................................ C02C 5/02
[58] Field of Search ..................... 210/10, 45–47, 210/42 R

[56] References Cited
UNITED STATES PATENTS 3,442,498  5/1969  Davis .................................. 210/10
3,720,608  3/1973  Stauffer ............................... 210/10
3,725,266  4/1973  Haviland .............................. 210/45

*Primary Examiner*—Thomas G. Wyse
*Attorney, Agent, or Firm*—Woodford R. Thompson, Jr.

[57] ABSTRACT

Gelatinous sludge agglomerations resulting from the clarification of raw water is separated from the raw water and is then treated with lime in an amount required to react with the gelatinous sludge and produce a filterable sludge in water. The filterable sludge is settled in the water carrying the same and is then separated therefrom and passed through filter means to separate solids from liquid.

4 Claims, 2 Drawing Figures

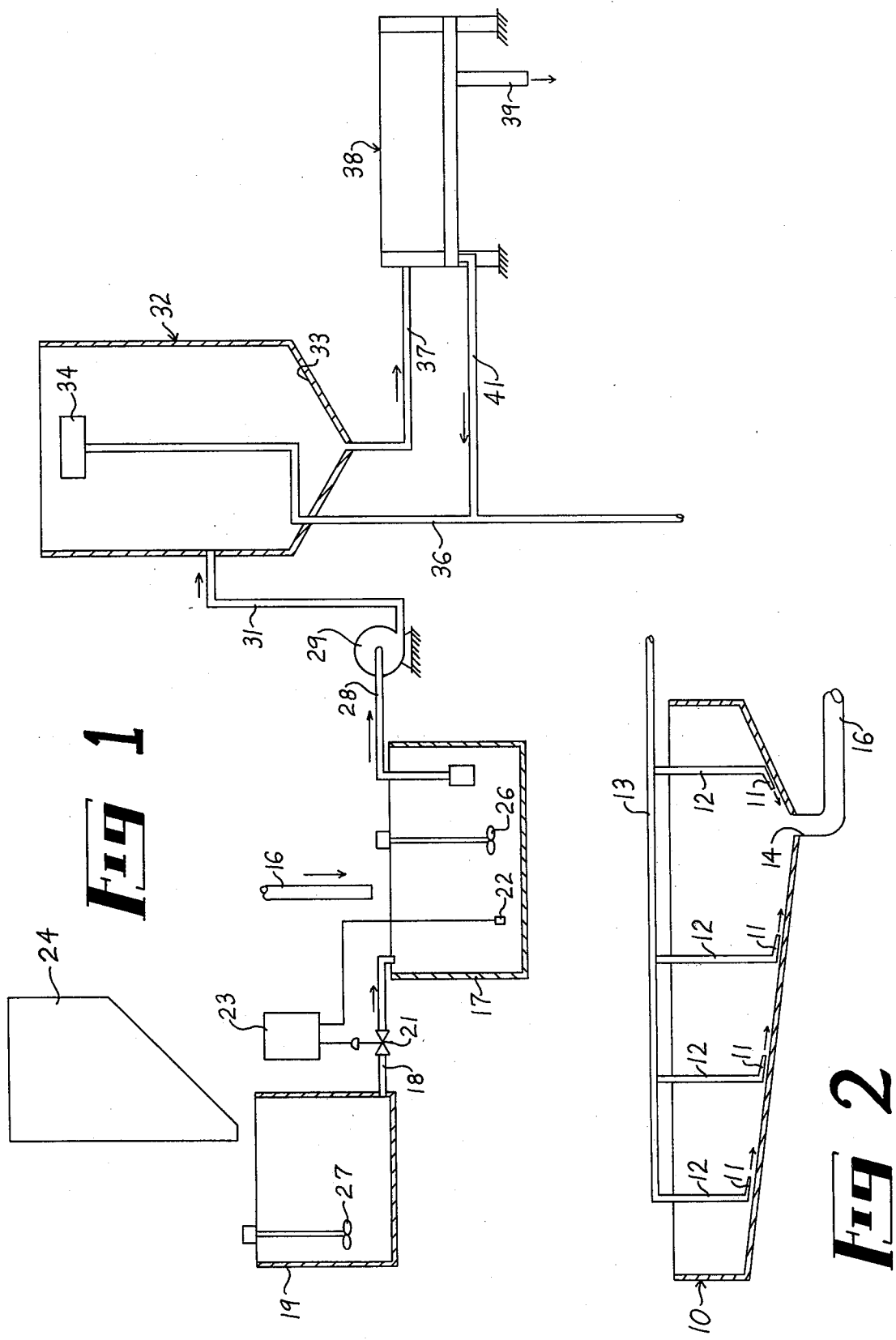

PROCESS OF TREATING GELATINOUS SLUDGE AGGLOMERATIONS

BACKGROUND OF THE INVENTION

This invention relates to a process for treating gelatinous sludge agglomerations resulting from the clarification of raw water and more particularly to such a process which converts the gelatinous sludge into a filterable sludge whereby the solids of the filterable sludge may be readily separated from the liquids.

In the process of clarifying raw water from natural sources, such as lakes, rivers, wells and the like, to yeild potable water, it is the usual practice to add to the raw water coagulants, such as alum with or without an alkali, such as lime and/or a synthetic coagulant, such as poly acrylamides. As is well known in the art to which our invention relates, these additives provide nuclei which attract the fine suspended solids of coloidial size or larger so as to form macroscopic agglomerations, which, with quiescence, tend to settle from the water. In the operation of water filtration plants to produce potable water, the agglomerations accumulate in settling basins or are trapped in and on the filter media employed for water clarification. The agglomerates thus accumulated in the settling basin contain aluminum hydroxide sludge which is quite gelatinous whereby it does not lend itself to filtration or water extraction by conventional means.

Heretofore, it has been usual practice to dispose of such gelatinous sludges accumulated in settling basins by flushing the same into surface streams or by discharging the gelatinous sludge to drying beds. Due to the pollution of surface streams, it is very desirable to remove these solids from settling basins by means other than flushing such solids to streams. While some water filtration plants have the large areas required for drying such gelatinous waste, many plants do not have such large areas for drying this waste.

SUMMARY OF THE INVENTION

In accordance with our invention, we provide a process of treating gelatinous sludge agglomerations resulting from the clarification of raw water by converting such gelatinous sludge into a filterable sludge which facilitates its removal from water. Upon passing the filterable sludge through a filter, the solids are separated from liquid whereby the solids are of such dryness as to permit the solids to be transported to land fills and be acceptable therein.

DESCRIPTION OF THE DRAWING

Apparatus in which our improved process may be carried out is illustrated in the accompanying drawing, forming a part of this application, in which:

FIG. 1 is a flow sheet apparatus which may be employed to treat the gelatinous sludge after it is removed from a settling basin; and, FIG. 2 is a diagrammatic view showing one method of removing the gelatinous sludge from the bottom of a settling basin.

DETAILED DESCRIPTION

Referring now to the drawing for a better understanding of our invention, we show in FIG. 2 a conventional type settling basin 10 which receives raw water from a suitable source. The raw water in the settling basin 10 has been treated by a suitable coagulant, such as lime and alum to precipitate impurities, such as solid matter. Due to the fact that large amounts of sludge accumulate in the settling basin, it is necessary to remove such sludge at intervals so as to maintain the overall efficiency of the system. The gelatinous sludge may be removed from the settling basin 10 by employing a series of water jets 11 which are connected by branch lines 12 to a water supply line 13. The jets 11 may be mounted adjacent the bottom of the settling basin 10 and turned on periodically and sequentially to continuously move the sludge toward a discharge opening 14 which communicates with a discharge conduit 16. Instead of mounting the water jets 11 adjacent the bottom of the settling basin 10, as shown in FIG. 2, the water jets 11 may be carried by a movable carriage or the like which moves the length of the settling basin 10 to remove the sludge to the drain opening 14. In view of the fact that various means may be employed for removing the gelatinous sludge from the settling basin 10, no further description thereof is deemed necessary.

The gelatinous sludge removed from the settling basin 10 by the conduit 16 is transferred to a reaction vessel 17. A slurry of lime is introduced into the reaction vessel 17 through a conduit 18 which in turn communicates with a lime slurry tank 19. A control valve 21 is provided in the conduit 18 and is controlled by a pH sensor 22 which is operatively connected to the control valve 21 through a suitable control panel 23. In view of the fact that such pH sensors and the control valves operatively connected thereto are conventional equipment, no further description thereof is deemed necessary. Lime is introduced into the lime slurry tank 19 from a suitable lime storage bin 24. Suitable agitator units 26 and 27 are provided in the reaction vessel 17 and the lime slurry tank 19, respectively, so that the contents thereof may be agitated.

The treated sludge is withdrawn from the reaction vessel 17 through a conduit 28 which communicates with the inlet of a pump 29. The outlet of the pump 29 communicates with a conduit 31 which delivers the treated sludge to a clarifier 32. In the clarifier 32, the heavy precipitate settles into the conical bottom 33 thereof while the clear supernatant liquid overflows through a weir 34 mounted adjacent the top of the clarifier, as shown. The clear supernatant is recycled with raw water to the conventional water treating system through a conduit 36.

The sludge settling in the bottom of the clarifier 32 passes through a conduit 37 to a conventional filter unit indicated generally at 38. The solids are discharged from the filter unit 38 through an outlet 39 and are suitable for land fill disposal. The clear filtrate is discharged from the filter unit 38 through a conduit 41 and is suitable for return to the inlet of the water treating system.

The chemical reactions involved in our improved process consists in converting the gelatinous aluminum hydroxide into a free filtering calcium aluminate, $$Ca(OH)_2 + 2Al(OH)_3 \rightarrow Ca(AlO_2)_2 + 4H_2O,$$

and converting the silicon dioxide into calcium aluminum silicate, $$Ca(OH)_2 + Al(OH)_3 + SiO_2 \rightarrow CaO \cdot Al_2O_3 \cdot 2SiO_2.$$

Also, the organic materials in the treated slurry are converted into materials which settle rapidly and are easily filtered. In actual practice, we have found that sufficient lime should be added to produce a pH of at least 11.5. Preferably, the lime is added as a slurry to eliminate waste, as would be the case where dry lime is added to the reaction vessel 17.

From the foregoing, it will be seen that we have devised an improved process for treating gelatinous sludge agglomerations resulting from the clarification of raw water. By converting the gelatinous sludge agglomeration into a filterable sludge, the solids may be readily separated from the liquid by conventional filters, such as inexpensive vacuum type filters. Accordingly, it is not required that the filterable sludge be separated by high pressure filters. Also, by providing a filterable sludge which may be separated from the liquid to produce a solid, such solids are particularly adapted for land fill use. Furthermore, our improved process eliminates entirely the necessity of having to dispose of the gelatinous sludges into surface streams or else dry such gelatinous sludges in drying beds.

While we have shown our invention in but one form, it will be obvious to those skilled in the art that it is not so limited, but is susceptible of various changes and modifications without departing from the spirit thereof.

What we claim is:

1. In the process of treating gelatinous sludge agglomerations containing aluminum hydroxide resulting from the clarification of raw water with coagulants wherein the treated raw water is allowed to settle into layers of gelatinous sludge containing aluminum hydroxide and a supernatant effluent comprising the following steps in the sequence named:
   a. reacting said gelatinous sludge with lime in an amount required to react with said aluminum hydroxide to form a precipitate and produce a filterable sludge in water,
   b. settling said filterable sludge in the water carrying the same,
   c. separating said filterable sludge thus settled from the water carrying the same, and
   d. passing said filterable sludge through filter means to separate solids from liquid.

2. The process of treating gelatinous sludge agglomerations as defined in claim 1 in which said gelatinous sludge also contains silicon dioxide and the amount of lime reacted with said sludge is at least as great as the stoichiometric amount required to react with said aluminum hydroxide and said silicon dioxide to produce a precipitate of calcium aluminum silicate.

3. The process of treating gelatinous sludge agglomerations as defined in claim 1 in which sufficient lime is reacted with said gelatinous sludge to produce a pH of at least 11.5.

4. The process of treating gelatinous sludge agglomerations as defined in claim 1 in which said lime is added as a slurry to said gelatinous sludge.

* * * * *